No. 679,609. Patented July 30, 1901.
E. E. ECKER.
BREECHING.
(Application filed Feb. 16, 1901.)
(No Model.)

Witnesses
V. R. Holcomb.
C. E. Buckland.

Inventor
Erastus E. Ecker, by
Harry R. Williams
Attorney

UNITED STATES PATENT OFFICE.

ERASTUS E. ECKER, OF ST. GEORGES, DELAWARE.

BREECHING.

SPECIFICATION forming part of Letters Patent No. 679,609, dated July 30, 1901.

Application filed February 16, 1901. Serial No. 47,546. (No model.)

*To all whom it may concern:*

Be it known that I, ERASTUS E. ECKER, a citizen of the United States, residing at St. Georges, in the county of Newcastle and State of Delaware, have invented certain new and useful Improvements in Harness-Breeching, of which the following is a specification.

This invention relates to that part of a harness which passes around the haunches for preventing the vehicle from running upon the horse.

The object of this invention is to provide a simple, light, strong, and comfortable breeching which is so constructed that it will not interfere with the stride of a horse when trotting, pacing, or running and will not draw the hind legs or slip up onto the back when going downhill with a heavy load.

The invention resides in a harness part having two light narrow breeching-straps the ends of which on each side are fastened to a common holdback-strap ring. The upper breeching-strap is arranged to pass high on the hips and around the buttocks just under the tail, where it is loosely connected with the crupper. The lower breeching-strap passes around the haunches a little lower—that is, just below the hindmost protuberant portions of the buttocks. A spring-stay extends from one breeching-strap to the other each side of the point of attachment of the crupper, and these hold the two breeching-straps separated, so that when upon the horse the buttocks protrude through the opening between the stays and the straps.

Figure 1:
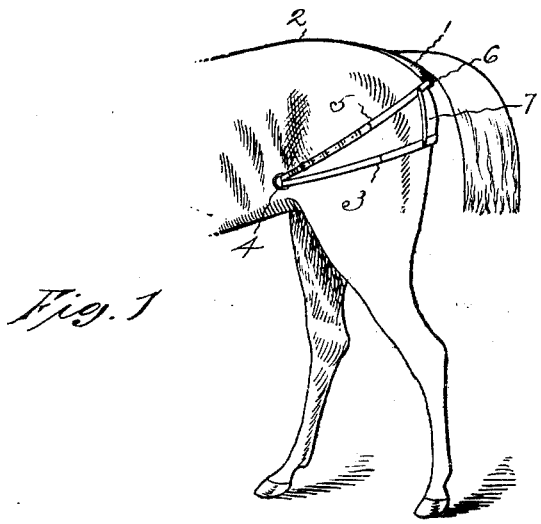
Figure 2:
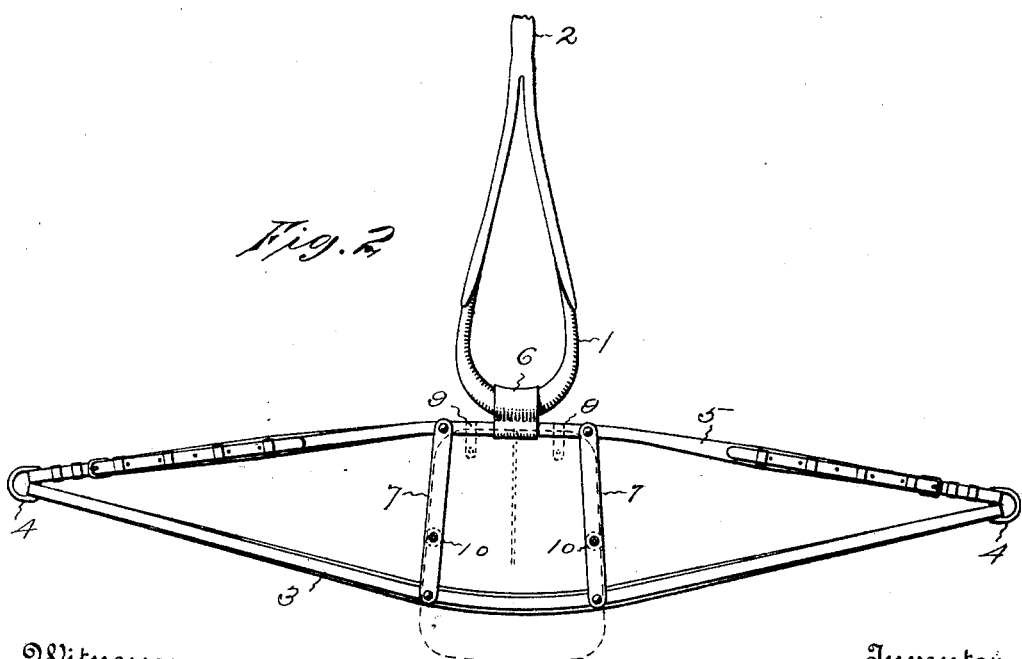

Of the accompanying drawings, which illustrate the invention, Figure 1 shows a view of the hind part of a horse with a breeching in place; and Fig. 2 shows a view, on a larger scale, of the breeching laid out flat.

The crupper 1, that is shown in the drawings, is of common shape and construction and is attached to the back-strap 2 in the usual manner. Each end of the lower breeching-strap 3 is looped through a holdback-strap ring 4, and each end of the upper breeching-strap 5 is passed through one of the rings and buckled to itself, so that its length may be adjusted with relation to the length of the lower strap. The upper breeching-strap passes through a loop 6, that is fastened to the crupper. The connection between the crupper and the upper strap is somewhat loose to permit the movement of one part with relation to the other. Stays 7 extend from one strap to the other each side of the point of attachment to the crupper. These stays are preferably made of strips of steel covered with leather, and they are sufficiently stiff to hold the straps separated.

An apron 8, (illustrated by the dotted lines in Fig. 2,) formed of leather or canvas, may, if desired, be fastened by loops 9 to the upper breeching-strap and by ball-and-socket fasteners 10 to the stays in order to form a covering for the space between the stays and the straps.

The breeching-straps work above and below the protruding portions of the buttocks and have a double bearing, which prevents chafing. As the straps when in position are not low enough to interfere with the free action of the hind legs, they may be drawn tightly across the haunches and around the rump, so that they can neither slip above nor drop below the buttocks. The crupper is loosely connected with the upper strap, so as to allow a little sidewise movement when the horse turns, and the apron, if used, forms a protection for the tail and the driver of the horse.

This invention is particularly applicable for racing-horses, and it is so constructed that when upon a horse it will not interfere with his gait, whether trotting, pacing, or running, and will not draw his legs together and cause him to interfere or strain his tendons. This tight breeching holds the horse straight in the shafts, and should he break immediate control is had over the horse, as there is no slack to be taken up, and, furthermore, there can be no jerking back and forth, due to slack, if the horse should run.

This breeching can be attached to any track or road harness, and it requires no hip-straps. It lies on the haunches and hips, so the action of the whirlbone does not cause it to chafe the skin, thus preventing soreness.

I claim as my invention—

1. A harness-breeching consisting of two straps connected at their ends, one strap being attached to the rear end of the crupper and the other depending below, whereby one strap, when the breeching is in use, passes above the protuberant portions of the buttocks, and the other strap passes just below the protuberant portions of the buttocks, substantially as specified.

2. A harness-breeching consisting of two straps connected at their ends, one strap being attached to the rear end of the crupper and the other depending below, whereby one strap, when the breeching is in use, passes above the protuberant portions of the buttocks and the other strap passes just below the protuberant portions of the buttocks, and stays connected with and holding the straps separated, substantially as specified.

3. A harness-breeching consisting of two straps connected at their ends, one strap being attached to the rear end of the crupper and the other depending below, whereby one strap, when the breeching is in use, passes above the protuberant portions of the buttocks and the other strap passes just below the protuberant portions of the buttocks, stays connected with and holding the straps separated, and an apron covering the openings between the stays and the straps, substantially as specified.

ERASTUS E. ECKER.

Witnesses:
V. R. HOLCOMB,
H. R. WILLIAMS.